May 1, 1962 J. J. MADDEN 3,031,736
FABRICATION OF MAGNETIC CORE STRUCTURES
Filed July 24, 1957 3 Sheets-Sheet 1

INVENTOR
J. J. MADDEN
BY Kenneth B Hamlin
ATTORNEY

INVENTOR
J. J. MADDEN
BY
Kenneth B Hamlin
ATTORNEY

May 1, 1962 J. J. MADDEN 3,031,736

FABRICATION OF MAGNETIC CORE STRUCTURES

Filed July 24, 1957

3 Sheets-Sheet 3

INVENTOR
J. J. MADDEN
BY Kenneth B Hamlin
ATTORNEY 3,031,736
Patented May 1, 1962

3,031,736
FABRICATION OF MAGNETIC CORE STRUCTURES

James J. Madden, Morristown, N.J., assignor to Bell Telephone Laboratories, Incorporated, New York, N.Y., a corporation of New York Filed July 24, 1957, Ser. No. 673,814
10 Claims. (Cl. 29—155.5)

This application relates to magnetic core devices and more particularly to the fabrication of such devices.

Magnetic core devices having substantially rectangular hysteresis characteristics are presently finding wide employment, particularly as storage elements, for example, in memory matrices. Such matrices generally comprise an array of such magnetic cores with coordinate sensing wires and a single read-out wire inductively coupled thereto. Information may be stored in any core in such an array by applying appropriate coincident current pulses to the two sensing wires and may be similarly read out by applying coincident current pulses of the opposite polarity to the sensing wires, an output pulse representing the information read out then appearing on the common read-out wire of the cores.

Hitherto such matrices have generally been fabricated by winding the wires through or around individual toroidal cores of a ferrite or metallic magnetic material, such as Permalloy. The winding of such cores and the subsequent mounting of the cores in an array has generally been done by hand and has in most instances proven difficult to mechanize in a facile and economic manner. Further, such arrays have required extensive wiring and have presented mechanical problems in the mounting and support of the cores.

It is a general object of this invention to provide an improved magnetic core structure.

More specifically, objects of this invention are to facilitate the fabrication, wiring, and assembling of magnetic cores and their mounting in an array.

Further objects of this invention include improving the fabricating techniques for magnetic cores, facilitating the handling of magnetic cores in an array, and improving the mounting and assembling of cores in an array.

In one specific illustrative embodiment of my invention each magnetic core storage element comprises three wires, around which is wrapped a sufficient number of turns of a magnetic tape, the latter comprising the magnetic core itself. Two of the wires are continuous and common to a plurality of such cores wound around them. The third wire is cut or segmented on either side of each core thus formed, and the ends thus projecting from the cores are bent at right angles to the other two wires.

A number of cores equal to the number of cores in a column of an array, for example, may thus be readily assembled on two common wires. The two common wires are then cut and, at the ends, similarly bent. The continuous core assembly, which for convenience may be designated as a core stick, may then, in accordance with another aspect of my invention, readily be mounted on a printed circuit board. In the illustrative embodiment of the present invention one of the continuous wires is employed as the sensing wire for the column of the array formed by the core stick. The other of the continuous wires is connected, by means of the printed circuit board, to other continuous wires of other sticks, the continuous wires thus connected comprising the common read-out wire for the array. The bent wire segments also passing through the cores are connected also by means of the printed circuit board to constitute the horizontal sensing wires for the individual rows of the array. In addition, the bent wire segments, also serve the function of providing convenient mounting and support members for the cores, each core being thus readily and securely held to the board.

Advantageously the wires are drawn to present a sectoral cross-section with the result that the three wires when fitted together form a convenient cylindrical mandrel on which the magnetic tapes comprising the cores may be readily wound.

It is a feature of this invention that a magnetic core structure comprise a plurality of wires closely fitted together and around which turns of a magnetic tape are closely wound.

It is a further feature of this invention that a plurality of such cores be wound on three such wires, two of which are common to the plurality of cores. Further in accordance with this feature, the third wire is individual to each core, being cut so as to have its ends at right angles to the two other wires.

It is another feature of this invention that a plurality of such cores on common wires be mounted by the common and individual wires on a printed wiring board in a manner such that the common wires define the read-out and column-sensing wires and the individual wires define the row-sensing wires of a core memory matrix.

It is still another feature of this invention that the cores of any column of the matrix be fabricated by combining a plurality of individual conductors together, cutting one of the conductors into segments, wrapping a magnetic tape around each individual segment of the one conductor, and securing the tape onto the conductors.

A further appreciation of these and various other features of this invention may be gained from the following detailed description, together with the accompanying drawing, in which.

Figure 1:
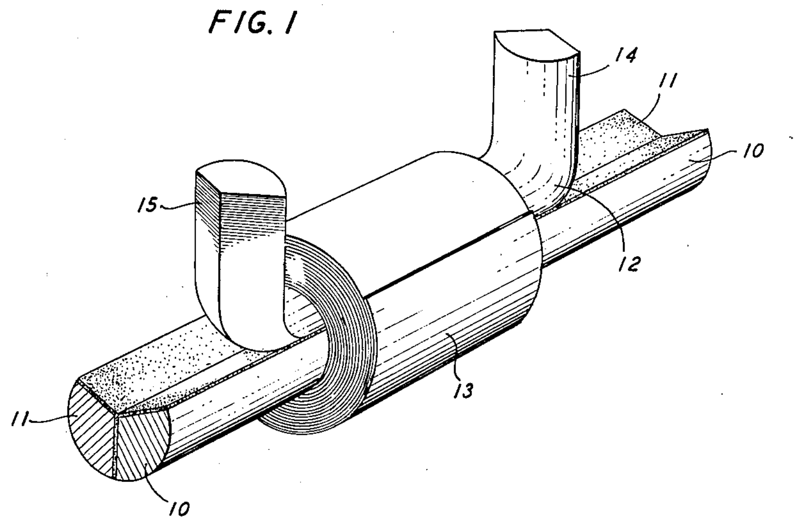
FIG. 1 is a perspective view of an individual magnetic core structure in accordance with one specific illustrative embodiment of this invention.

Turning now to the drawing, the specific embodiment depicted in FIG. 1 illustrates a single magnetic core structure in accordance with my invention and is seen to comprise three wires 10, 11, and 12, having a substantially sectoral cross-section which may advantageously be of copper and be coated, as with magnesium oxide, so that the wires are insulated from each other. Two of the wires are continuous and are understood to continue through other magnetic core structures, as described further hereinafter. The third wire 12, however, is segmented and its ends bent at right angles to the other two wires to form two leg portions 14 and 15. These three wires in effect constitute the windings of the magnetic core structure.

In accordance with an aspect of my invention, the manufacture of magnetic core assemblies and arrays is facilitated by winding the core around the wires, rather than the converse which has hitherto been the usual procedure. Thus, in this specific embodiment the core 13 comprises a plurality, such as twenty, turns of a magnetic tape wound around the three wires inside the leg portions 14 and 15 of wire 12. The outer layer of the tape core is advantageously spot welded in place to secure the core onto the wires.

In one specific illustrative embodiment the core 13 comprises twenty turns of one-quarter mil Permalloy tape coated with magnesium oxide and wound around the three wire sectors 10, 11, and 12, which together form a cylindrical mandrel having an outer diameter of approximately one-sixteenth of an inch. After fabrication of the individual core structure, as described above, it may be heat treated, in a manner known in the art.

Figure 2:
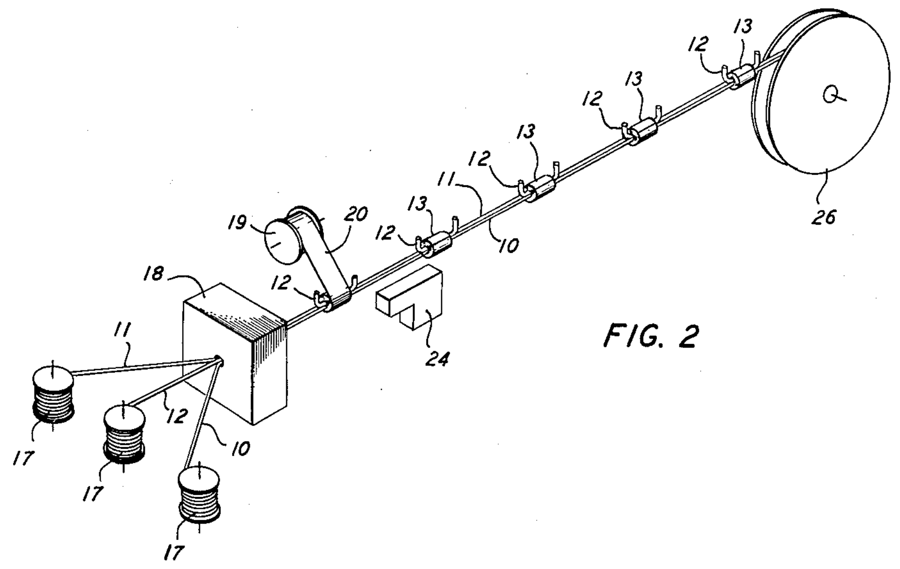
FIG. 2 is a representational showing of one illustrative fabricating arrangement in accordance with this invention.

The fabrication of the individual cores, such as that depicted in FIG. 1, on the continuous wires 10 and 11 so as to form core sticks or subassemblies may advantageously be accomplished as depicted in FIG. 2. As there shown, the sectored wires 10, 11 and 12 are supplied from spools 17 to an indexing unit 18 which coats the wires with magnesium oxide and cuts and bends the wire 12. The wires, which may conveniently be held together in cylindrical form at this time by the adhesive insulating coating, are then fed to a tape supply position where the magnetic tape 20 is fed from a supply reel 19 and wrapped around the fitted wires 10, 11, and 12. A tape shearer and welding unit 24 cuts the tape and welds the last turn to achieve the compact core 13. The wires 10 and 11, carrying the core 13 and wire 12, may then be wound upon a storage reel 26 for subsequent cuttings to size as needed, depending upon the number of cores in a column in the core matrix to be made up, and subsequent incorporation in the core matrix.

Figure 3:
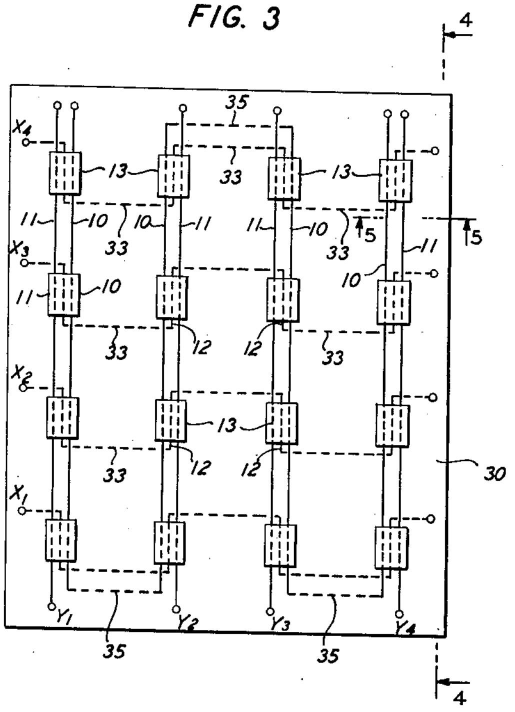
FIG. 3 is a schematic representation of a matrix array in accordance with this invention and employing the core structures of FIG. 1.

FIG. 3 depicts a magnetic core matrix in accordance with my invention. As there shown, the matrix comprises a plurality of cores 13 wound about wires 10, 11, and 12, as just described, and mounted upon a printed wiring board 30. As readily seen in FIG. 4, each core 13 is individually secured to the board by the leg portions 14 and 15 of wire 12, which are connected by any suitable conductive means, such as by solder 32, to printed wires 33 of the board 30. The wires 12, in the embodiment depicted in FIG. 3, comprise the X, or horizontal, coordinate sensing wires of the array and are joined together by the printed wires 33. The four horizontal wires of the array are identified, at one terminal of each, as $X_1$, $X_2$, $X_3$, and $X_4$.

Figure 4:
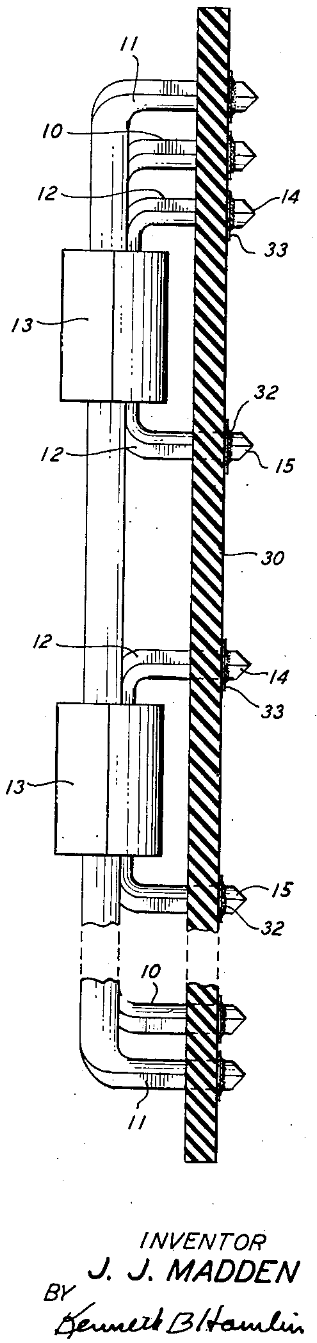
FIG. 4 is a sectional view taken along the line 4—4 of FIG. 3.

The wires 10 of the core sticks or subassemblies are joined only at opposite ends to adjacent subassemblies by printed wires 35 and comprise the single read-out wire of the array, as indicated by the letter R at each terminal. Accordingly, as seen in FIG. 4, the ends of the wires 10 extend through the board 30 and also aid in mounting the subassembly on the board.

The wires 11 comprise the Y, or vertical, coordinate sensing wires and are individual to each subassembly. They, too, however, have their ends extending through the printed circuit board 30. In FIG. 3 the four vertical sensing wires are identified as $Y_1$, $Y_2$, $Y_3$, and $Y_4$.

Figure 5:
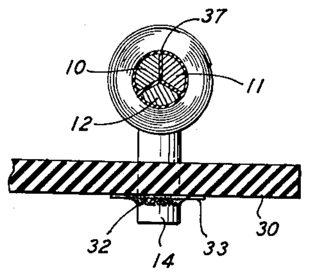
FIG. 5 is another sectional view taken along the line 5—5 of FIG. 3.

As seen from FIG. 5, the cores are so arranged that the wire segments 12 individual to each core are positioned closest to the board 30. The insulating coating 37 around and between the wires 10, 11, and 12 is also clearly shown in FIG. 4, exaggerated for purposes of clarity.

Figure 6:
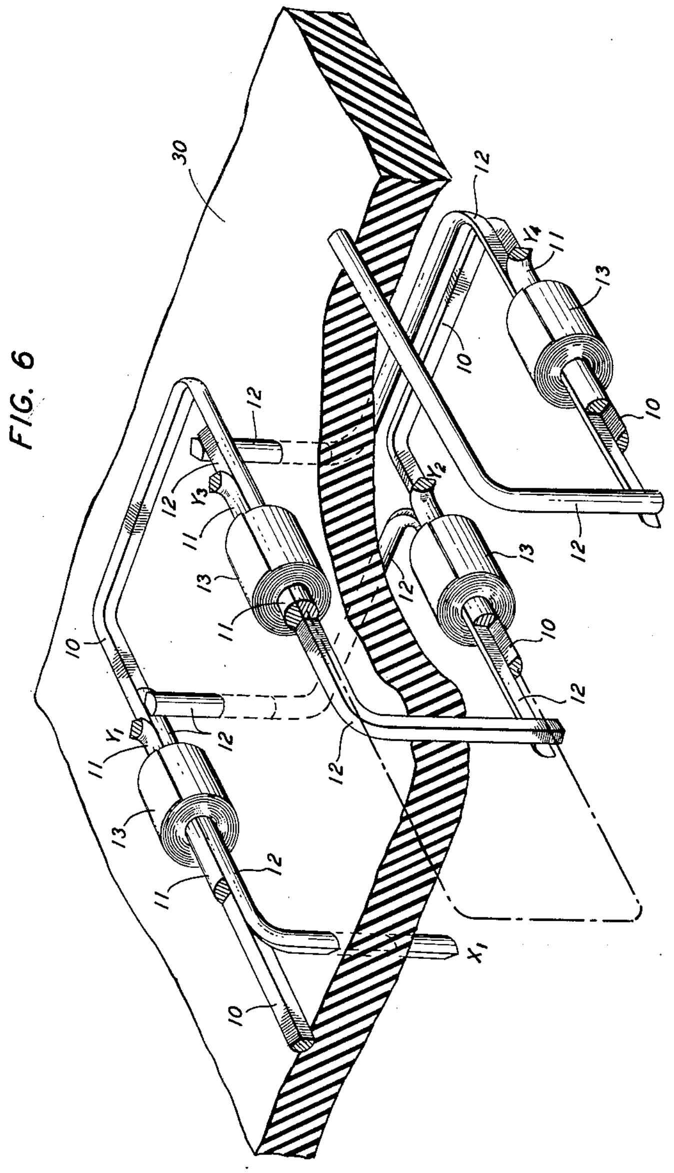
FIG. 6 is a schematic representation of another illustrative matrix construction in accordance with the principles of this invention.

In FIG. 6 is shown another matrix structure which may advantageously be fabricated using the core subassemblies of this invention. In this figure the same reference characters have been employed to designate corresponding structural elements. The structure of FIG. 6 may most conveniently be described by a comparison with the matrix arrangement of FIG. 3, and particularly with the row $X_1$ of that figure. The segmented wires 12 of the cores 13 of FIG. 6 are turned at right angles at only one end and the turned portion is then held in the board 30 to secure the cores 13 in a permanent position. In this structure the turned portions of the wires 12 of alternate cores are introduced through the board 30 from opposite sides, the portions then being conductively connected to the other ends of the wire segments 12 as shown.

Obviously in this structure no printed circuitry is required to complete the matrix circuit connections and half of the cores will be on either side of the board 30. The circuit connections complete conductive paths identical to that of the matrix shown in FIG. 3. Thus the segmented wires 12 connected together and the continuous wires 11 and 10, about which the cores 13 are wound, constitute the X coordinate, Y coordinate, and read-out conductors, respectively.

It is readily apparent that the core structures and methods of my invention are easily adaptable to high-speed automatic production wherein the basic unit, the core assembly and its associated wires, can be made and stored in continuous lengths. Further, the problem of handling minute cores and elements individually is obviated, as the smallest piece to be handled is the stick of cores all wound around the common wires. In addition to eliminating the necessity of handling small parts, the necessity of individual wiring of each core, whether by manual or automatic means, is eliminated. Finally, because of the novel arrangements of my invention, core assemblies may be very small with resultant economies in space.

It is also readily apparent that while the structure of my invention has been depicted in a two-dimensional magnetic core matrix, it may readily also be utilized in other magnetic core circuit arrangements and specifically in multidimensional arrays.

The above-described arrangements are to be understood as merely illustrative of the principles of the invention. Numerous modifications could be made by those skilled in the art without departing from the spirit and scope of the invention.

What is claimed is:

1. The method of fabricating magnetic core assemblies comprising adhesively combining a plurality of insulated conductors together along their lengths, cutting less than all of said conductors into segments, and winding said conductors and segments so formed with magnetic tape to form a magnetic core at each of said segments.

2. The method of fabricating magnetic core assemblies comprising adhesively joining a plurality of insulated conductors together along their lengths, cutting less than all of said conductors into segments, winding magnetic tape around said conductors and segments so formed to form a magnetic core at each of said segments, heat treating each of said cores, and connecting the ends of said conductors and segments to circuit elements.

3. The method of fabricating magnetic core assemblies comprising coating a plurality of conductors with adhesive insulation, joining said plurality of insulated conductors together along their lengths, cutting less than all of said conductors into segments, bending the ends of each of said segments so formed at right angles to said conductors, winding magnetic tape around said conductors and segments to form a magnetic core at each of said segments, inserting said segment ends through a printed wire board, and connecting said ends to prearranged circuit elements on said board.

4. The method of fabricating magnetic core assemblies comprising combining a plurality of adhesively insulated conductors in a cable, severing less than all of said conductors into segments, turning the ends of each segment so formed at an angle with the others of said plurality of conductors, winding magnetic tape around said conductors and segments to form at least one magnetic core at each of said segments, heat treating each of said cores, applying said ends to a mounting board having a prearranged circuit means thereon, and connecting said ends to said prearranged circuit means.

5. The method of fabricating magnetic core assemblies comprising coating a first plurality of conductors with adhesive insulation, joining said first plurality of insulated conductors together along their lengths by means of said insulation, severing at least one and less than all of said conductors into segments, bending an end of each of said segments away from said conductors, winding magnetic tape around said conductors and segments to form a magnetic core at each of said segments, welding each of said cores, and connecting each of said ends to the other end of the segments of a second plurality of joined insulated conductors.

6. The method of fabricating magnetic core assemblies according to claim 5, also comprising inserting said segment ends of said first plurality of insulated conductors through a mounting board from one side and inserting said segment ends of said second plurality of joined insulated conductors through said mounting board from the other side.

7. The method of fabricating a chain of magnetic core assemblies comprising the steps of adhesively combining together a plurality of insulated conductors having sectoral cross sections along the lengths thereof, severing into segments at least one and less than all of said conductors, bending the ends formed by severing said one conductor away from others of said conductors, winding magnetic tape about all of said conductors at the center of each segmented portion of said one conductor, and heat treating said tape including welding said tape to form a magnetic core at each of said segmented portions.

8. The method of fabricating a chain of magnetic core assemblies comprising the steps of coating a plurality of conductors having sectoral cross sections with adhesive insulating material, combining together said plurality of insulated conductors, along the lengths thereof, severing into segments at least one and less than all of said conductors, bending the ends formed by segmenting said one conductor at right angles to the others of said conductors, and winding magnetic tape tightly about all of said conductors at the center of each portion formed by segmenting said one conductor.

9. A method of fabricating a magnetic core structure comprising the steps of coating each of a plurality of wires, each having a substantially sectoral cross section, with an adhesive insulating coating; grouping a preselected number of said wires in the form of a cable, which form is maintained by said adhesive coatings; cutting one of said wires of the cable into segments along the length thereof; bending the ends of said segments to project at right angles to the others of said wires; wrapping all of said wires in the cable tightly with magnetic tape at each of said individual segments of the segmented one of said wires, including shearing said tape to the correct length to form a plurality of magnetic cores; welding and heat treating each of said cores to secure the outer end thereof and to relieve internal strains which might tend to cause eddy currents; and storing the finished structure by winding said structure on a reel.

10. A method of fabricating a magnetic core structure comprising the steps of coating each of a plurality of wires, each having a substantially sectoral cross section, with an adhesive insulating coating; associating a preselected number of said wires in the form of a cable, which form is maintained by said adhesive coatings; cutting one of said wires of the cable into segments along the length thereof; bending the ends of said segments to project at right angles to the others of said wires; wrapping all of said wires in the cable tightly with magnetic tape at each of said individual segments of the segmented one of said wires, including shearing said tape to the correct length to form a plurality of magnetic cores; welding and heat treating each of said cores to secure the outer end thereof and to relieve internal strains which might tend to cause eddy currents; and inserting said segment ends through a printed wiring board having prearranged matrix circuitry thereon.

References Cited in the file of this patent

UNITED STATES PATENTS

| | | |
|---|---|---|
| 1,088,902 | Hunter | Mar. 3, 1914 |
| 2,246,239 | Brand | June 17, 1941 |
| 2,282,759 | Gavitt | May 12, 1942 |
| 2,333,015 | Kramer et al. | Oct. 26, 1943 |
| 2,334,584 | Rich | Nov. 16, 1943 |
| 2,353,511 | Short | July 11, 1944 |
| 2,674,659 | Buhrendorf | Apr. 6, 1954 |
| 2,700,150 | Wales | Jan. 18, 1955 |
| 2,719,965 | Person | Oct. 4, 1955 |
| 2,732,542 | Minnick | Jan. 24, 1956 |

FOREIGN PATENTS

| | | |
|---|---|---|
| 708,162 | France | Apr. 27, 1931 |